United States Patent [19]

Ortiz Jr.

[11] Patent Number: 4,812,641
[45] Date of Patent: Mar. 14, 1989

[54] HIGH POWER OPTICAL FIBER FAILURE DETECTION SYSTEM

[75] Inventor: Angel L. Ortiz Jr., Ballston Lake, N.Y.

[73] Assignee: General Electric Company, Schenectady, N.Y.

[21] Appl. No.: 10,503

[22] Filed: Feb. 3, 1987

[51] Int. Cl.$^4$ ................................................ G01J 1/32
[52] U.S. Cl. ................................ 250/205; 250/227; 356/73.1; 219/121.62
[58] Field of Search ............... 356/73.1; 219/121 LA, 219/121 LB; 250/227, 205; 128/303.1

[56] References Cited

U.S. PATENT DOCUMENTS

| | | | |
|---|---|---|---|
| 4,311,142 | 1/1982 | Machida | 219/121 LB |
| 4,423,726 | 1/1984 | Imagawa et al. | 128/303.1 |
| 4,543,477 | 9/1985 | Doi et al. | 250/227 |
| 4,673,291 | 6/1987 | Heckmann | 356/73.1 |
| 4,673,795 | 6/1987 | Ortiz | 219/121 L |
| 4,695,697 | 9/1987 | Kosa | 219/121 LB |

OTHER PUBLICATIONS

G. K. Lewis and R. D. Dixon, "Plasma Monitoring of Laser Beam Welds", Welding Research Supplement, Feb. 1985, pp. 49s–54s.

*Primary Examiner*—David C. Nelms
*Attorney, Agent, or Firm*—Donald R. Campbell; James C. Davis, Jr.; Paul R. Webb, II

[57] ABSTRACT

A break or leak in an optical fiber transmitting high power laser energy, at average power levels sufficient for material processing, is detected promptly and the laser beam delivery system shut down when the optical fiber begins to fail. Photo detectors monitor the laser power out of the fiber and injection power into the fiber, in particular the light intensities in the fiber input and output couplers. A difference in detector outputs, larger than a set threshold to account for inherent fiber losses, is an indication that a break or leak has occurred.

5 Claims, 3 Drawing Sheets

HIGH POWER OPTICAL FIBER FAILURE DETECTION SYSTEM

BACKGROUND OF THE INVENTION

This invention relates to a system and method for detecting a break or leak in an industrial optical fiber transmitting high power laser energy.

Flexible laser beam delivery through a single optical fiber at power levels sufficient for manufacturing processes such as drilling, cutting, welding, heat treating and laser surfacing has been demonstrated and is disclosed in commonly assigned patents and copending applications. A laser beam generated by a solid-state total-internal-reflection face-pumped laser or any other high power laser which is operated in pulsed mode, and has a wavelength in the near infrared or visible spectrum, is focused onto the fiber core. More than 400 watts of average laser power have been transmitted through a thin optical fiber for material processing. The integration of a laser to a robot with a fiber optic system increases the flexibility of a laser processing workstation. With the technical advances in high power laser transmission through optical fibers, and the concepts of Flexible Manufacturing Cells/Workstations using lasers coming closer to reality, there is a need to provide a failsafe interlock system to detect breaks in fiber conduits. The occurrence of a leak or break in the fiber conduit will shut the laser system down thus preventing any serious damage or injury to personnel and equipment. If the fiber link is routed through walls and ceilings after an installation, the potential for a fire hazard exists, and thus a fiber break and leak detection system is required for a safe installation.

The use of a laser transmission sensor as an integral part of the output module manipulated by a robot is described in the inventor's copending application Ser. No. 660,837, filed Oct. 15, 1984, now U.S. Pat. No. 4,673,795, "Integrated Robotic Laser Material Processing and Imaging System". If the laser beam is turned on but its presence is not immediately sensed by the photodiode, a break is indicated and the interlock arrangement turns off the laser. This invention is directed to a complete leak and break detection system for any robotic/laser/fiber configured cell or workstation. Other prior art approaches are given, for instance, in U.S. Pat. Nos. 4,311,142 and 4,476,512. These have disadvantages such as placing sensors on the fiber itself, which are costly especially on long fibers, slow response to heat changes if the fiber fails, loss of output power due to monitoring, and EMI problems in a factory environment.

SUMMARY OF THE INVENTION

An object of the invention is to provide an improved laser material processing system and high power fiber break and leak detector that shuts off the laser beam as the power fiber begins to fail.

Another object is an improved method of monitoring the laser power transmitted by a high power optical fiber and detecting fiber failure in a manner that is compatible with an industrial environment and acts before damage occurs.

This invention utilizes photo detectors to sense the laser power exiting the power optical fiber and the injection laser power, and electronics to compare the output power level to the input level. A continuous monitoring of the difference will given an indication that a break or leak in the power fiber has occurred. As the difference increases less laser energy is exiting the fiber, and a break will produce a maximum difference.

The laser beam delivery system is comprised of a laser which provides a high power laser beam, an input coupler to shape the beam and inject laser energy into one end of the fiber core, and an output coupler to collect emerging laser energy and focus the beam on a workpiece at a power density sufficient to perform material processing tasks. The improved fiber break and leak detection system according to the preferred embodiments comprises means including a first photo detector to sense the light intensity at the input coupler and the injection laser power, and a second photo detector at the output coupler to sense exit illumination and power out of the fiber. Means are provided to compare the injection and output laser power levels and detect a decrease in the latter that exceeds a set threshold and indicates the beginning of a break or leak in the power fiber, and to trigger laser system shutdown.

The photo detectors are located on and sense the ambient lumens inside the input and output couplers; alternatively sensing optical fibers on the couplers transmit the light intensity to remotely located photo detectors. The comparing means may comprise a comparator whose output signal varies with the difference between photo detector signals. The detection electronics may further include a trigger level adjustment to which the comparator output signal is presented to select the difference between fiber input and output power levels to cause laser system shutdown. The trip level takes inherent fiber losses into account which are a function of fiber core material, cladding, fiber length, and laser wavelength.

Another aspect of the invention is a method of promptly detecting a break or leak in a power optical fiber. The laser power injected into and exiting the fiber are monitored with first and second photo detectors. The difference between photo detector outputs is continuously monitored to detect a decrease in exiting laser energy due to leakage from the optical fiber, and the laser is shut down when the fiber begins to fail.

DETAILED DESCRIPTION OF THE INVENTION

Figure 1:
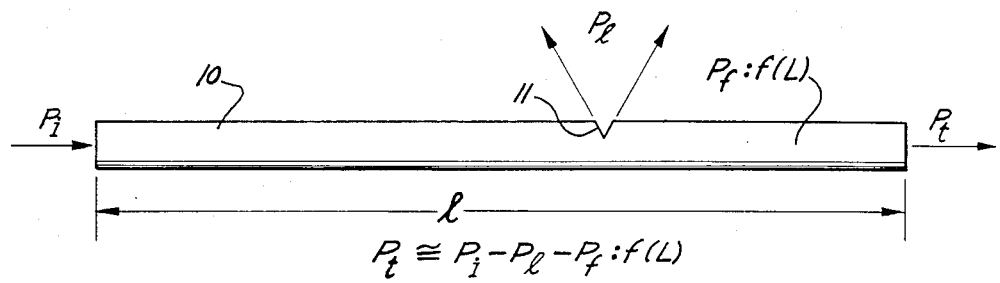
FIG. 1 shows a simplified model of power loss in an optical fiber.
Figure 2:
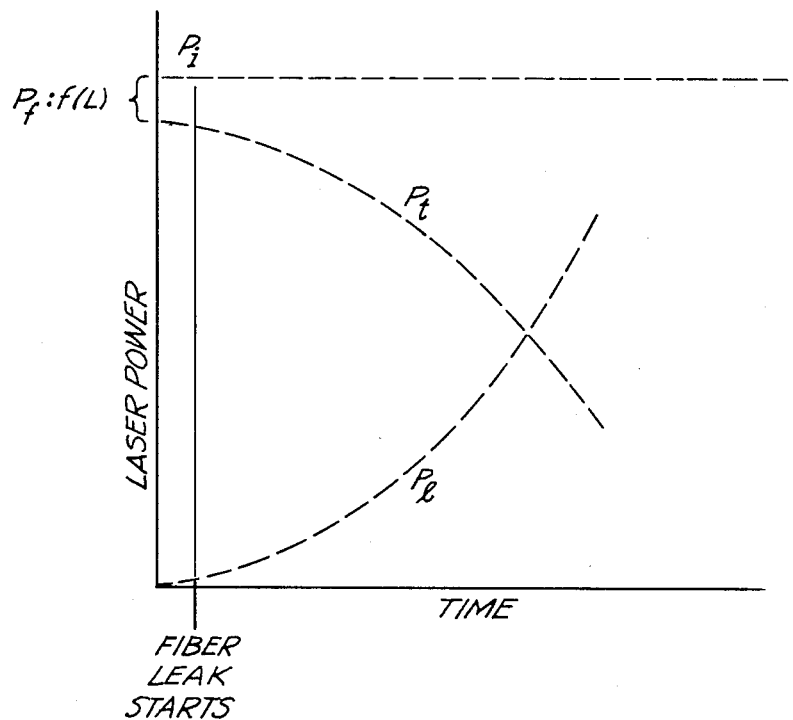
FIG. 2 illustrates graphically, as a leak in the fiber begins, the decrease in transmitted laser power and increase in leak power with time.

In FIG. 1, an optical fiber 10 has a small nick or hole 11 that extends through the protective covering into the cladding or into the core and results in a loss of laser energy transmitted through the fiber. The defect may be in the purchased optical fiber or develops in use due to manipulation of the fiber in the factory after installation and during a manufacturing process. The nick or hole changes the refractive index at the protective covering-cladding interface or the cladding-core interface, allowing light to escape out of the fiber. The equation for the simplified model of power loss, $P_t = P_i - P_l - P_f f(L)$, states that the transmitted laser power $P_t$, equals the injection power $P_i$, minus power loss from a fiber leak $P_l$ minus the inherent power loss of the fiber $P_f f(L)$. The inherent fiber loss is a function of fiber core material, cladding material, fiber length l, and laser wavelength. As a leak in the fiber begins, the transmitted laser power begins to decrease and the leak power increases with time. As depicted in FIG. 2, the rate of loss of exiting laser energy and the rate of increase in leak power both increase rapidly and are also a function of input laser power. Low power for injection will cause damage to happen more slowly than if high power was used. With the laser energy used in materials processing now as high as 400 to 650 watts of average laser power, and anticipated to reach 1000 watts, the leak power can reach substantial levels in a short time causing the fiber to melt and burn. At these power levels laser energy passing through the shielding results in burning and consequent degradation of the fiber. Another failure mode, of course, is breakage of the fiber or core resulting in a very rapid loss of laser power.

Figure 3:
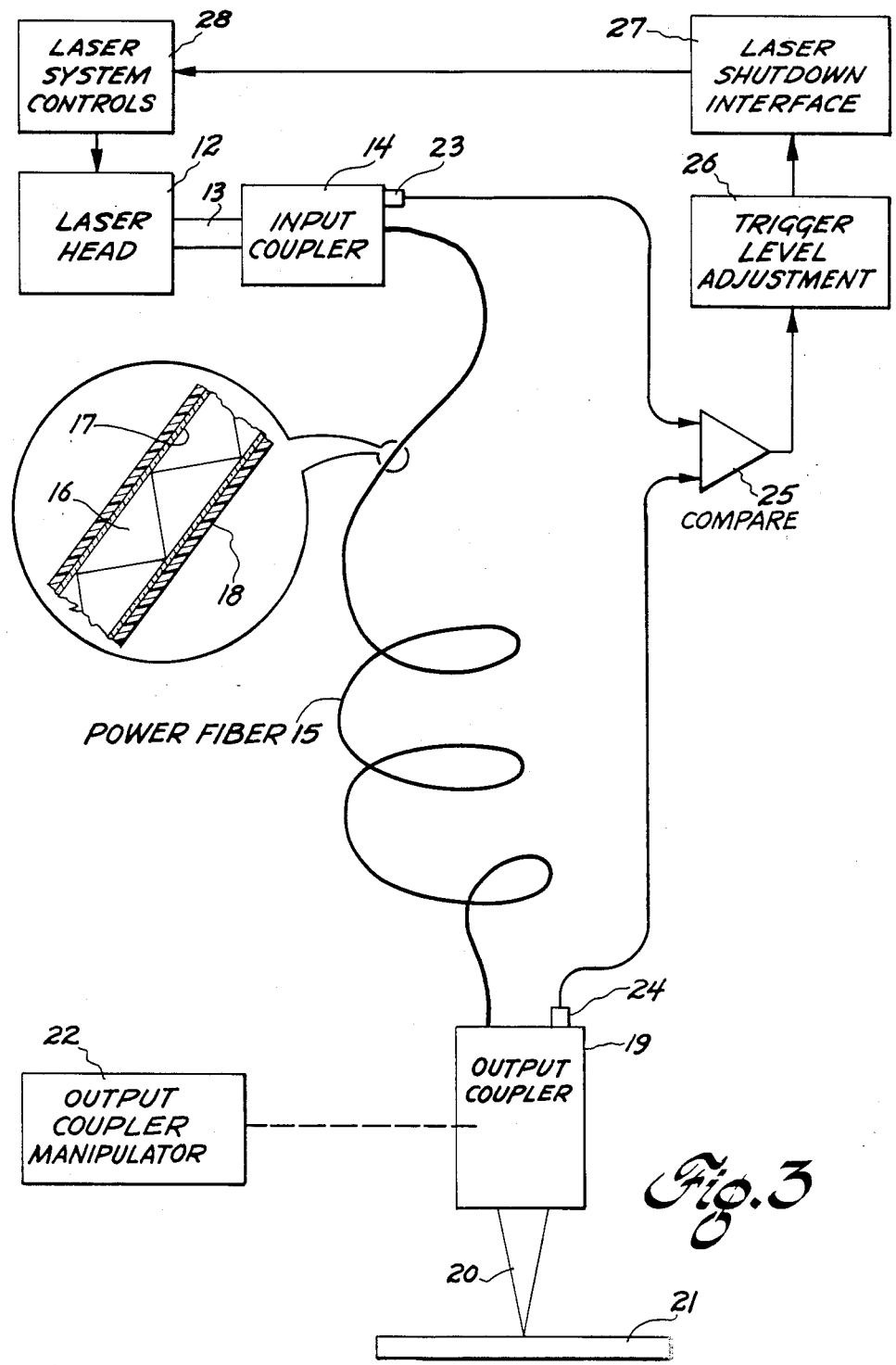
FIG. 3 shows the high power optical fiber transmission system and one embodiment of the fiber failure detection system.

An implementation of the fiber leak and break detection system is illustrated in FIG. 3. The laser is a pulsed solid-state, total-internal-reflection face-pumped (TIR-FPL) laser that generates a high power, low divergence beam at a 1.06 micrometer wavelength. Other material processing lasers typically are those operated in a pulsed mode and having a wavelength in the near infrared or visible spectrum, such as the Nd:YAG, ruby and alexandrite lasers. The high power laser beam 13 out of the laser head 12 is directed into a fiber input coupler 14 which holds the prepared end of the fiber and shapes the laser beam in a way to inject laser energy into the power optical fiber 15. In order for the laser beam to enter the fiber core, the diameter of the laser beam spot at the focal plane of the input coupler is less than the core diameter, and the included angle of the focused beam must be less than twice the numerical aperture (NA) of the fiber.

Referring to the enlarged cross-section, optical fiber 15 preferably has a fused quartz core 16 with a transparent silicon cladding 17 and an outer nylon jacket 18 for physical protection. The power fiber 15 is mechanically flexible and has a core diameter less than 1,000 micrometers and as small as 200 micrometers. An output coupler 19 holds the other end of the power fiber and collimates and focuses the emerging laser beam to a small spot at a power density high enough for material processing. The focused laser beam 20 is illustrated cutting, drilling, or welding a metal workpiece 21. The fiber output coupler 19 is held by a manipulator 22, i.e. a robot, CNC (computerized numerical control) table, etc., and moves the output coupler over the workpiece 21 to be processed.

The system to promptly detect a fiber break or leak is comprised of two photo detectors which monitor the injection laser power and power out of the optical fiber 15. A photo detector 23 is placed inside of fiber input coupler 14, and senses the ambient lumens inside the input coupler and monitors the laser power being injected. The detector output signal is sent to the fiber failure detection electronics. Installing a second photo detector 24 inside of fiber output coupler 19 is used to monitor the laser power out to the workpiece. This second signal also goes to the detection electronics which compares the laser power levels into and out of power fiber 15. If a leak in the power fiber occurs, the output power of the fiber will decrease. This change in output power level can be used to trigger a laser system shutdown. The outputs of photo detectors 23 and 24 are compared in a comparator 25 whose output signal varies with the difference between the detector signals. The detection electronics allows for a threshold adjustment in order to set the trip level taking the inherent fiber losses into account. These inherent losses vary from fiber to fiber and depend on its length, which may be anywhere from a few feet to more than 250 feet in factory equipment. The difference between fiber input and output power levels to cause laser system shutdown can be selected and set at 26. When the fiber begins to fail a trip signal is received by laser shutdown interface 27 which signals the laser system controls 28 to shut down the laser head 12 and turn off the laser beam.

Figure 4:
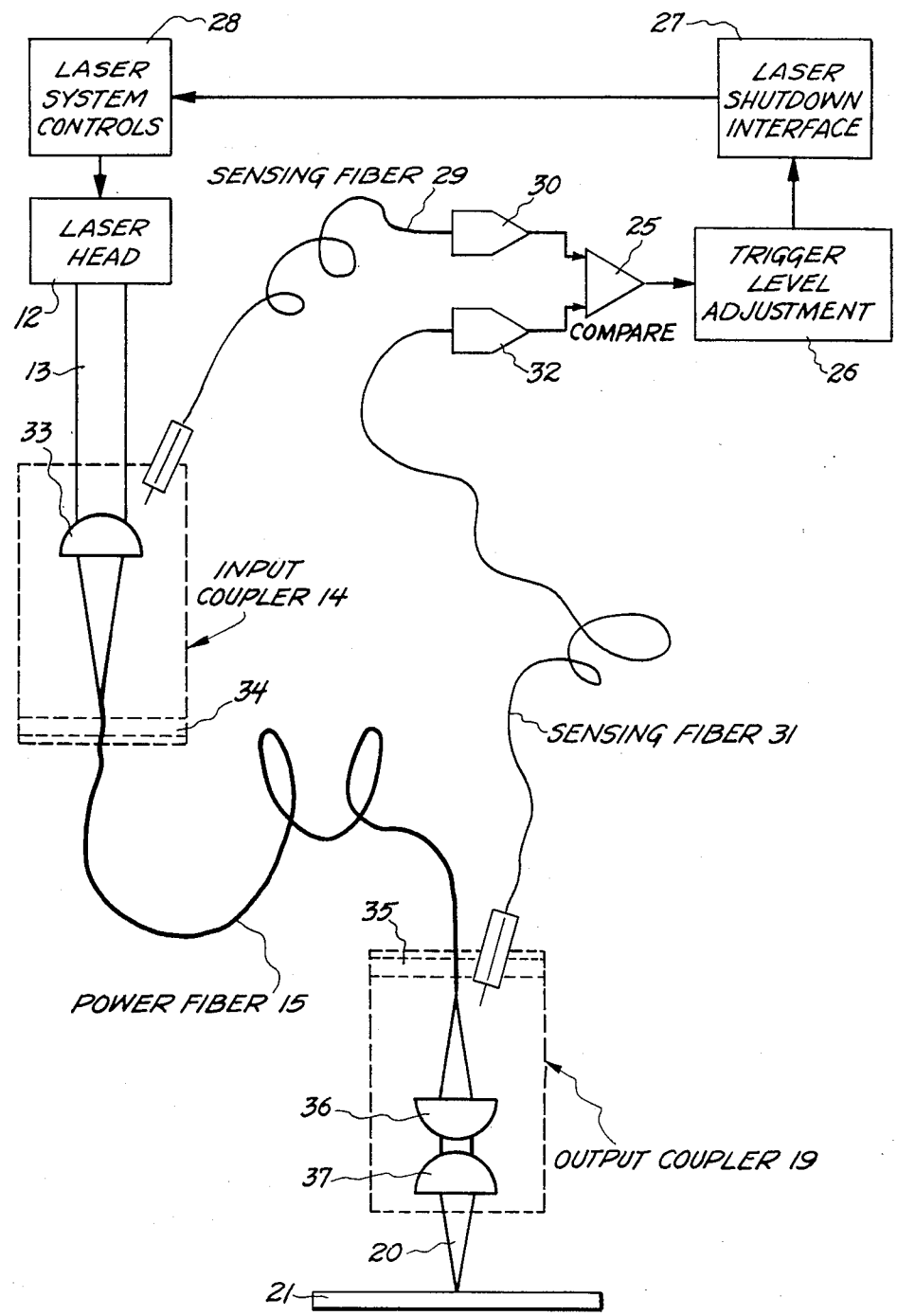
FIG. 4 shows the power fiber system and the preferred embodiment of the fiber break and leak detection system with optical fiber sensors.

The preferred embodiment of the fiber break and leak detection system is depicted in FIG. 4. Instead of having photo detectors in the fiber input and output couplers, smaller diameter optical fibers are provided to transmit the light intensities inside the couplers. Sensing fiber 29 is mounted on input coupler 14 and transmits the ambient lumens injected into power fiber 15 to a photo detector 30 in the detection electronics. A second sensing fiber 31 on the other coupler transmits the ambient lumens from output coupler 19 to a second photo detector 32. The output of photo detectors 30 and 32 is compared at 25 and depending on where the trigger level is set at 26, shuts the laser system off when the power optical fiber 15 begins to fail, i.e. leak or break.

Suitable photo detectors for this failure detection system are Hewlett Packard HP4420 photodiodes which have a good response to a YAG (yttrium-aluminum-garnet) laser beam wavelength of 1.06 micrometers. An even better choice is the Centronic OSI-5L, a silicon photodiode with an integrated amplifier having very low thermal drift and designed to detect YAG laser energy with 80% responsitivity.

FIG. 4 also illustrates input and output couplers 14 and 19 in greater detail. The collimated laser beam 13 output by the laser is focused to a small spot by the focusing lens 33. The end of power fiber 15 is prepared by removing the shielding plus cladding, then only the cladding, and clamped in a glass or quartz holder as shown schematically at 34. A cylindrical housing encloses the input optics and supports the varous components. There are reflections from the lenses, fiber end, and enclosing structure that illuminates the inside of the coupler. Output coupler 19 similarly is comprised of a holder 35 for the prepared output end and output optics formed by collimating and focusing lenses 36 and 37. The fiber end preparation and output coupler may be configured as shown in U.S. Pat. Nos. 4,673,795 and 4,564,736, the disclosures of which are incorporated herein by reference, and the input coupler design is obvious from these. More information on the power fiber optic laser transmission system (components 12–19) is given in copending application Ser. No. 714,660, filed Mar. 21, 1985, M. G. Jones and G. Georgalas, a continuation of Ser. No. 450,951, filed Dec. 2, 1984, now abandoned; and application Ser. No. 659,125, filed Oct. 9, 1984, now U.S. Pat. No. 4,681,396, M. G. Jones, which discloses the Nd:YAG TIR-FPL laser in such systems.

In conclusion, this high power optical fiber failure detection system has a fast response to a leak or break and shuts off the laser system when the fiber begins to fail. It can be used in a factory environment, there are no losses of laser power due to monitoring, is easy to install and maintain, and can determine when the power optical fiber is beginning to degrade through long usage.

While the invention has been particularly shown and described with reference to illustrative embodiments, it will be understood by those skilled in the art that various changes in form and details may be made without departing from the spirit and scope of the invention as defined in the appended claims.

The invention claimed is:

1. A laser beam delivery system comprising a laser having a wavelength of 1.06 micrometers or less which generates a high power laser beam, a single clad quartz optical fiber, an input coupler to shape said beam and inject laser energy into one end of said optical fiber, an output coupler to collect laser energy emerging from the other end of said optical fiber and focus said beam at a power density sufficient to perform industrial material processing, and an improved fiber break and leak detection system comprised of:

means for monitoring injection laser power and power out of said optical fiber including first and second photo detectors to respectively sense light intensities inside said input and output couplers;

means for comparing injection and output laser power levels and detecting a decrease in the latter that exceeds a set threshold and indicates the beginning of a break or leak in said optical fiber; and means for triggering a laser system shutdown upon detection of such a decrease in the laser output power level.

2. The system of claim 1 wherein said first and second photo detectors are remotely located and sensing optical fibers on said input and output couplers transmit the light intensities therein to said photo detectors.

3. The system of claim 2 wherein said comparing means is comprised of a comparator having an output signal that varies with the difference between outputs of said first and second photo detectors.

4. The method of promptly detecting a break or leak in a power optical fiber transmitting laser energy exceeding 400 watts of average laser power which is supplied by a laser through an input coupler and injected into one end of said fiber and delivered through an output coupler at the other end of said fiber to a workpiece to perform industrial material processing, comprising:

monitoring with first and second photo detectors, which respectively sense light intensities inside said input and output couplers, the laser powers injected into and exiting said optical fiber;

continuously monitoring the difference between photo detector outputs to detect a decrease in the exiting laser power due to a break or leak in said optical fiber; and shutting down said laser when said difference exceeds a preset level and said optical fiber is beginning to fail.

5. The method of claim 4 wherein said preset level to trigger laser shutdown takes into account inherent fiber losses which are a function of fiber core and cladding materials, fiber length, and laser wavelength.

* * * * *